United States Patent
Rouh et al.

(10) Patent No.: US 10,262,398 B2
(45) Date of Patent: Apr. 16, 2019

(54) METHOD FOR CORRECTING AN IMAGE OF AT LEAST ONE OBJECT PRESENTED AT A DISTANCE IN FRONT OF AN IMAGING DEVICE AND ILLUMINATED BY A LIGHTING SYSTEM AND AN IMAGE PICKUP SYSTEM FOR IMPLEMENTING SAID METHOD

(71) Applicant: MORPHO, Issy les Moulineaux (FR)

(72) Inventors: Alain Rouh, Issy les Moulineaux (FR); Jean Beaudet, Issy les Moulineaux (FR); Jeremy Dura, Issy les Moulineaux (FR); Laurent Rostaing, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 9 days.

(21) Appl. No.: 15/080,176

(22) Filed: Mar. 24, 2016

(65) Prior Publication Data
US 2016/0284068 A1   Sep. 29, 2016

(30) Foreign Application Priority Data
Mar. 25, 2015 (FR) ................. 15 52495

(51) Int. Cl.
*G06K 9/00* (2006.01)
*G06T 5/00* (2006.01)
(Continued)

(52) U.S. Cl.
CPC .......... *G06T 5/002* (2013.01); *G06T 5/008* (2013.01); *G06T 7/514* (2017.01); *G06T 7/521* (2017.01);
(Continued)

(58) Field of Classification Search
CPC . G06T 2207/10012; G06T 2207/20012; G06T 5/002; G06T 5/008; G06T 7/514; G06T 7/521; G06T 7/593
See application file for complete search history.

(56) References Cited

U.S. PATENT DOCUMENTS 6,009,188 A * 12/1999 Cohen ............... G06T 15/50
345/419
6,064,759 A * 5/2000 Buckley ............... G01B 11/024
348/125
(Continued)

FOREIGN PATENT DOCUMENTS

JP   2002-015311 A   1/2002
WO  2014/187917 A1  11/2014

OTHER PUBLICATIONS

Lowe; "Object Recognition from Local Scale-Invariant Features;" Published in:Proceedings of the International Conference on Computer Vision; 1999; vol. 2; pp. 1150-1157.
(Continued)

*Primary Examiner* — Avinash Yentrapati
(74) *Attorney, Agent, or Firm* — Oliff PLC; R. Brian Drozd (57) ABSTRACT

An image correction method includes: estimating a 3D model of an object as when an imaging device takes an image of the object; calculating the light intensity of each point of a simulated image as it would be taken by the imaging device, using the estimated 3D model of the object, a model of illumination of the object illuminated by a lighting system that illuminates the object, a model of reflection on a surface of the object, and a model of the imaging device, to obtain a simulated image of the object; and correcting the taken image by modifying the light intensity of each point on the taken image or on at least one area of interest of the taken image, according to the light
(Continued)

intensity of the corresponding point in the simulated image or the respective light intensities of points adjacent to the corresponding point in the simulated image.

9 Claims, 5 Drawing Sheets

(51) Int. Cl.
  *G06T 7/514* (2017.01)
  *G06T 7/521* (2017.01)
  *G06T 7/593* (2017.01)
(52) U.S. Cl.
  CPC .... *G06T 7/593* (2017.01); *G06T 2207/10012* (2013.01); *G06T 2207/20012* (2013.01)

(56) References Cited

U.S. PATENT DOCUMENTS

| | | | | |
|---|---|---|---|---|
| 6,088,612 | A * | 7/2000 | Blair | A61B 1/00048 250/559.05 |
| 6,160,907 | A * | 12/2000 | Robotham | G06T 13/00 345/419 |
| 8,164,594 | B2 * | 4/2012 | Watanabe | G06T 15/60 345/426 |
| 8,923,575 | B2 * | 12/2014 | Tsukada | H04N 1/62 382/119 |
| 9,565,388 | B2 * | 2/2017 | Nakajima | H04N 9/73 |
| 9,721,345 | B2 * | 8/2017 | Engel | G09B 19/24 |
| 2003/0123713 | A1 * | 7/2003 | Geng | G06K 9/00201 382/118 |
| 2004/0150641 | A1 * | 8/2004 | Duiker | G06T 13/80 345/426 |
| 2005/0008199 | A1 * | 1/2005 | Dong | G06K 9/00288 382/115 |
| 2009/0052767 | A1 * | 2/2009 | Bhalerao | G06T 15/50 382/154 |
| 2009/0238449 | A1 * | 9/2009 | Zhang | G01B 11/2536 382/165 |
| 2010/0034432 | A1 * | 2/2010 | Ono | G06K 9/00255 382/118 |
| 2011/0182520 | A1 * | 7/2011 | Free | G06K 9/00241 382/195 |
| 2012/0268571 | A1 * | 10/2012 | Debevec | H04N 13/282 348/48 |
| 2014/0055570 | A1 * | 2/2014 | Dehais | G06T 17/20 348/47 |
| 2015/0146032 | A1 * | 5/2015 | Rime | H04N 7/01 348/222.1 |
| 2015/0161816 | A1 * | 6/2015 | Grenfell | G06T 11/001 345/426 |
| 2016/0100122 | A1 * | 4/2016 | Nakajima | H04N 9/73 348/687 |
| 2016/0284094 | A1 * | 9/2016 | Wetzler | G06T 7/586 |
| 2016/0307032 | A1 * | 10/2016 | Butler | G06K 9/00208 |

OTHER PUBLICATIONS

Bay et al; "SURF: Speeded Up Robust Features;" Published in 9th European Conference on Computer Vision; May 7-13, 2006; Graz, Austria; pp. 1-14.

Hartley et al; Mulitple View Geometry in Computer Vision; 2000; Cambridge.

Feb. 5, 2016 Search Report issued in French Patent Application No. 1552495.

* cited by examiner

METHOD FOR CORRECTING AN IMAGE OF AT LEAST ONE OBJECT PRESENTED AT A DISTANCE IN FRONT OF AN IMAGING DEVICE AND ILLUMINATED BY A LIGHTING SYSTEM AND AN IMAGE PICKUP SYSTEM FOR IMPLEMENTING SAID METHOD

The present invention relates to a method for correcting an image of at least one object presented at a distance in front of an imaging device and illuminated by an illumination system, as well as an image pickup system for implementing said method.

Image pickup systems integrating a system for illuminating the scene to be taken are known and mention can be made, by way of example, of biometric image pickup systems in which the image of a face, of an iris or of a fingerprint of a person is used for recognition purposes, systems for picking up images of documents, such as identity documents, residence evidence, tickets for games, etc., in which the image of the document or a part thereof is used for the purpose of recognising the identity of the bearer of said document etc.

In the prior art, a system for picking up image of a flat document is also known, which consists of a flat scanner functioning as follows. The document in question is placed flat on a window of the scanner at a known position determined by said window and is uniformly illuminated by means of suitable light source. An imaging device receives the light from the light source, which is reflected on the document, and delivers corresponding image signals for each pixel of the image, at the intensity of the reflected light. The light source and the imaging device are for example mounted on a bar that scans the document so as to obtain therefrom a complete image of the document. Since the light source is very close to the document, illumination of the document is uniform over the entire surface of the document.

Likewise, since the imaging device is very close to the document, the light intensity that it receives therefrom corresponds to the light intensity reflected thereby. Thus, because the light source illuminates the document with a light that is uniform in intensity over the surface of the document, the light that is received by the imaging device solely represents the way in which it is reflected on the document. Thus a surface that is not very reflective, and which therefore appears rather black on the object, reflects little light and the corresponding pixels in the image delivered by the imaging device are "dark" pixels. Conversely, a reflective surface, which therefore appears white on the object, reflects more light and the corresponding pixels in the image delivered by the imaging device are "light" pixels.

The homogeneity of lighting of documents may in particular be corrected by calibration because in particular their position is known and does not depend on the document in question.

A system for picking up an image of at least one object according to the present invention is of the type that comprises an imaging device and a lighting system consisting of at least one light source, but, unlike the example of the document scanner cited above, the position of the object or of each object in question is not predetermined. This object is presented at a distance from the imaging device and from the light source or sources of the lighting system and may thus adopt any possible position with respect to each one, optionally while being deformed. For example, if the object in question is a flat document, such as an identity card, it may be presented at a distance in front of the imaging device and the light source, aslant, inclined and slightly warped. In addition, this position of the object changes from picking up to picking up. The same applies to a face, an iris or a fingerprint of a person passing in front of a biometric photography system.

Because of this, the lighting of the object by the lighting system and the capture of the rays reflected on the object by the imaging device are dependent on the position of the object at the moment of picking up an image. Difficulties may result from this, for the subsequent operations of processing the image taken by the image pickup system, because of an unwanted reflection, lack of contrast in certain areas, etc.

This non-uniformity of lighting of the object results from the fact that the light striking it is dependent on the spatial distribution of the light intensity conferred by the lighting system. This spatial distribution is for example in the form of a lobe of the or each light source constituting said lighting system with a maximum light intensity in the principal axis of the source and a weakened light intensity on moving away from said principal axis. In addition, the light intensity that strikes a point on the object decreases as the square of the distance that separates it from the light source. Thus, the further this point is away from a light source, the lower the light intensity that strikes this point. The intensity of the light that is reflected on the object depends not only on the reflection characteristics of the light according to the surface of the object but also on the inclination of this surface with respect to the axis of the light source. Finally, the light intensity received by the imaging device varies according to the square of the distance that separates the imaging device from each point on the object.

These phenomena lead to considering that the light that is received under these conditions by an object is not uniform over the entire surface thereof and that the quantity of light received by the imaging device depends not only on the reflectivity of this surface but also on the position of the object with respect to the light source and the imaging device. When the image signals delivered by the imaging device are used for subsequent image processing, such as for example the recognition of characters on the object, this non-uniformity may give rise to problems because of insufficient contrast of certain parts of the image of the object taken by the imaging device.

In general terms, because the illumination of an object by the lighting system and the capture of the rays reflected on the object by the imaging device are dependent on the position of this object at the time the image picking up, the image taken by the imaging device may not be of sufficient quality for subsequent processing.

There is therefore, under these circumstances, a need for a method for correcting images taken by an imaging device that makes a corrected image close to an image of said object taken under uniform light conditions.

The aim of the present invention is therefore to propose such a method for correcting images taken by an image pickup system for taking an image of an object presented at a distance that does not have the drawbacks presented above.

To do this, the present invention relates to a method for correcting an image of an object presented at a distance taken by an imaging device, said object being illuminated by means of a lighting system. It is characterised in that it comprises the following steps:

a step of estimating a 3D model of the object as it is at the time when an image is taken by said imaging device, an image simulation step consisting of simulating the image taken by said imaging device, using said 3D model thus estimated, a model of the illumination of the object by said lighting system, a model of reflection on the surface of an object and a model of said imaging device, in order to obtain a simulated image of said object, and a step of correcting the image taken by said imaging device, consisting of modifying the light intensity of each point on the image and of at least one area of interest of the image actually taken by the imaging device according to the light intensity of the corresponding point in the simulated image or the respective light intensities of points adjacent to said corresponding point in the simulated image.

Advantageously, said correction step includes:

a calculation step for calculating, for each point of the image or of at least one area of the image taken by said imaging device, a correction factor that is a decreasing function of the light intensity of the corresponding point in the simulated image of said object, and a processing step for modifying the light intensity of each point of the image or of at least one area of the image actually taken by said imaging device in proportion to said correction factor.

According to another feature of the invention, said image correction method further includes:

a step of determining points on the simulated image for which the light intensity is above a maximum threshold, a step of determining points on the simulated image for which the light intensity is below a minimum threshold, said correction step not being performed for the points on the image taken by the imaging device corresponding to the points on the simulated image for which the light intensity is above a maximum threshold.

According to another advantageous feature, it also includes a step of creating a mask corresponding to the points thus determined so that subsequent image processings of the corrected image do not take into account the corresponding points on said corrected image.

Advantageously, said step of determining said 3D model uses a stereoscopic method involving pairs of views taken by said 3D photography system, said 3D photography system consisting either of two cameras taking respectively the views of each pair simultaneously, or a camera taking the views of each pair at two different times. For example, one or other or both of the two cameras of said 3D photography system constitutes said imaging device.

The present invention also relates to an image pickup system for taking an image of an object presented at a distance in front of an imaging device, said object being illuminated by means of a lighting system. Said system is characterised in that it comprises:

means for estimating a 3D model of the object as it is at the time said imaging device takes said image, image simulation means consisting of simulating the image taken by said imaging device, using said 3D model estimated by said estimation means, a model of the illumination of the object by said lighting system, a model of reflection on the surface of an object and a model of said imaging device, in order to obtain a simulated image of said object, and means for correcting the image taken by said imaging device in order to modify the light intensity of each point on the image or of at least one area of interest of the image actually taken by the imaging device according to the light intensity of the corresponding point in the simulated image or the respective light intensities of points adjacent to said corresponding point in the simulated image.

Advantageously, said image pickup system comprises:

calculation means for calculating, for each point on the image or on at least one area of the image taken by said imaging device, a correction factor that is a decreasing function of the light intensity of the corresponding point in the simulated image of the said object, and processing means for modifying the light intensity of each point on the image or at least one area of the image actually taken by said imaging device in proportion to said correction factor.

Advantageously, said image pickup system also comprises:

means for determining points on the simulated image for which the light intensity is above a maximum threshold, means for determining points on the simulated image for which the light intensity is below a minimum threshold, said correction means not taking into account the points on the image taken by the image corresponding to the points on the simulated image thus determined.

Advantageously, said image pickup system also comprises means for creating a mask corresponding to the points thus determined by said determination means, said mask being designed so that subsequent image processings of the corrected image do not take into account the corresponding points of said corrected image.

The features of the invention mentioned above, as well as others, will emerge more clearly from a reading of the following description of an example embodiment, said description being given in relation to the accompanying drawings, among which.

Figure 1:
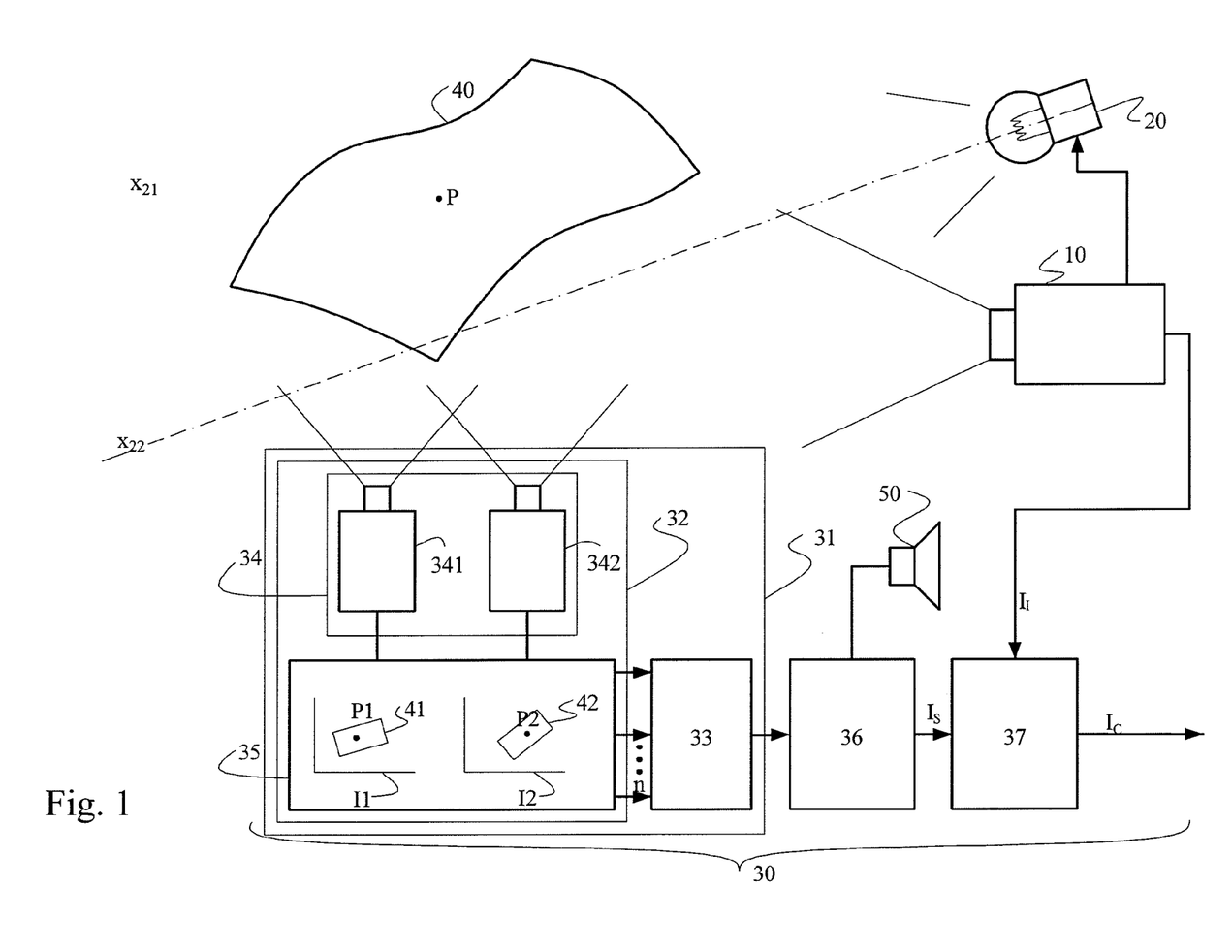
FIG. 1 is a block diagram of an image pickup system according to a first embodiment of the invention.

The image pickup system depicted in FIG. 1 consists of an imaging device 10 that is designed to deliver image signals $I_r$, a lighting system consisting of at least one light source (in this case, a single light source 20 depicted schematically in the form of a bulb forming the light source), and a processing unit 30.

The imaging device 10 can be designed to take an image or a series of images such as a video sequence. In this case, the image $I_r$ involved in the present description is each image in the video sequence.

According to the invention, the processing unit 30 comprises an estimation unit 31 for estimating a 3D model of an object 40 as it is at the time T0 of the taking of the image done by the imaging device 10.

In the embodiment depicted, the estimation unit 31 comprises a modelling unit 32 for determining a 3D model of the object 40. This modelling unit 32 comprises firstly a 3D image pickup apparatus 34 and secondly a processing unit 35 designed to carry out the 3D modelling proper.

The 3D image pickup apparatus 34 may be any type known to persons skilled in the art, such as a structured-light system or a time-of-flight camera. In the embodiment that is the subject of the present invention and which is given by way illustration, the 3D image pickup apparatus 34 consists of a stereoscopic system comprising two cameras 341 and 342.

To illustrate the invention, in FIG. 1, in front of the cameras 341 and 342, there is a single slightly warped flat object 40. This object 40 is presented at a distance in front of the imaging device 10 and in front of a lighting system, here consisting by way of example of a single light source 20 (that is to say presented at a distance in front of the imaging device 10 and the lighting system 20 without this object 40 resting on a reference surface, such as a scanner window, and without its position being previously known). It is also presented in front of the 3D image pickup apparatus 34, here the cameras 341 and 342. A particular point P on this object is also depicted.

The present invention is also relevant if a plurality of objects 40 IS presented in front of the 3D image pickup apparatus 34.

The processing unit 35 is designed to receive the image signals from the 3D photography system 34, for example the cameras 341 and 342, and, when an object 40 is detected in front of them (a detection made either by the processing unit 30 or by any suitable detection means), determines, from these image signals, a 3D model of the object 40 in front of it.

The functioning of the processing unit 35 is explained below in the case where the image pickup apparatus 34 has two cameras 341 and 342. These cameras 341 and 342 are calibrated, which means that their intrinsic parameters are known and used by the processing unit 35. These intrinsic parameters are for example given by coefficients of a matrix K. Likewise, the extrinsic parameters of one of the cameras, for example the camera 342, with respect to the other one in the pair, are determined and used by the processing unit 35.

The image I1 delivered by the camera 341 and the image I2 delivered by the camera 342 have been depicted in the box of the processing unit 35. The images 41 and 42 of the object 40 and the images P1 and P2 of any point P on the object 40 can be seen therein respectively.

The images respectively thus formed of a point P of coordinates (x, y, z) are respectively points P1 and P1 of coordinates (u1, v1) and (u2, v2) in the respective images of I1 and I2 that satisfy the following equations:

$$\lambda_1 \begin{bmatrix} P_1 \\ 1 \end{bmatrix} = K[I_3 \ 0] \begin{bmatrix} P \\ 1 \end{bmatrix} \quad (1)$$

and $$\lambda_2 \begin{bmatrix} P_2 \\ 1 \end{bmatrix} = K'[R_{12} \ T_{12}] \begin{bmatrix} P \\ 1 \end{bmatrix} \quad (2)$$

where the matrix $[R_{12} \ T_{12}]$ ($R_{12}$ is a rotation matrix and $T_{12}$ is a translation matrix) expresses the extrinsic parameters of the camera 342 with respect to the camera 341 and $\lambda_1$ and $\lambda_2$ are unknown factors representing the fact that an infinity of antecedent points corresponds to the same image point P1 and P2. $I_3$ is the unity matrix of dimensions 3×3.

The processing unit 35 is designed to match image points P1 and P2 of the images respectively taken by the cameras 341 and 342, which are situated between respective image points of the same antecedent point P. This matching is known to persons skilled in the art and can be carried out by the method that is disclosed in the article by David G. Lowe, entitled "Object recognition from local scale-invariant features" published in *Proceedings of the International Conference on Computer Vision*, vol 2 (1999) p 1150-1157. The document by Herbert Bay, Tinne Tuytelaars and Luc Van Gool entitled "SURF: Speeded Up Robust Features" published in *9th European Conference on Computer Vision*, Graz, Austria, 7-13 May 2006 also mentions such a method.

The above equations show that, with regard to each pair of image points (P1, P2) thus matched, there is a linear system of 6 equations with only 5 unknowns, which are respectively the two factors $\lambda_1$ and $\lambda_2$ and the three coordinates x, y, z of the same antecedent point P of these image points P1 and P2. It is therefore possible, from the images supplied by the calibrated cameras 341 and 342, to determine the coordinates x, y, z of any antecedent point P of a pair of matched points P1, P2 and thus, considering a plurality of pairs of matched points (P1, P2), to determine a 3D model of the object 40 in front of them.

What is here called a 3D model of an object is a set of discrete points P of coordinates (x, y, z) that belong to the real object. Other points that also belong to the real object but which do not belong to this set of discrete points may be obtained by extrapolation of points of the 3D model.

As a supplement to what has just been stated here, the work by Hartley, Richard and Andrew Zisserman entitled "Multiple View Geometry In Computer Vision", Cambridge, 2000, can be consulted, in particular for the disclosure of the above mathematical model of the method for modelling by stereoscopy by means of two calibrated cameras.

The processing unit 35 is designed to control at least one image taking made by the 3D image pickup apparatus 34 at a time t (which may be the time T0 an image 10 is taken) or at successive times t0 to tn, and to establish, according to the method disclosed above, a 3D model of the object 40 at the corresponding time t. If several images are taken at successive times t0 to tn (as is the case in FIG. 1), an extrapolation unit 33 is able to establish the movement of the object 40 (translation and rotation) and to estimate its position at the predetermined time t0. This position will be referred to hereinafter as the "position at the image taking time T0". What is referred to as the "position of the object 40" is the coordinates of each of the points that constitute the 3D model.

The processing unit 30 also comprises a simulation unit 36 that is designed to simulate an image taken by the imaging device 10 having regard to the illumination of the object 40 by the light source 20. Thus the simulation unit 36 estimates a quantity of light issuing from the light source 20, then the quantity of light reflected by said object in the direction of the imaging device 10, and finally the quantity of light received by the imaging device 10. To do this, this image simulation uses the 3D model that was previously determined by the estimation unit 31, an illumination model of the lighting system 20, a model of reflection of the light on an object, and a model of the imaging device 10. It can also use various algorithms, such as the radiosity algorithm, analytical photometry algorithms, the ray-tracing algorithm, etc.

The lighting model defines the or each light source 20 of the lighting system, for example by their intrinsic parameters representing the distribution of the intensity of the light in the various directions in space and the characteristics of this light (spectrum, polarisation, etc) as well as their extrinsic parameters (position of the light source 20 considered with respect to the imaging device 10 and to the 3D image pickup apparatus 34.

The model of reflection on an object used is for example a Lambertian model for perfectly diffusing reflections or a Phong model for diffusing reflections and specular reflections.

The model of the imaging device may be a simplified so-called "pinhole" model with a lens in the form of a hole or pinhole and a sensor on which the image of the scene is formed.

The result of the image simulation carried out by the simulation unit 36 is a digital image that is, in the remainder of the description, referred to the simulated image $I_S$.

Figure 2:
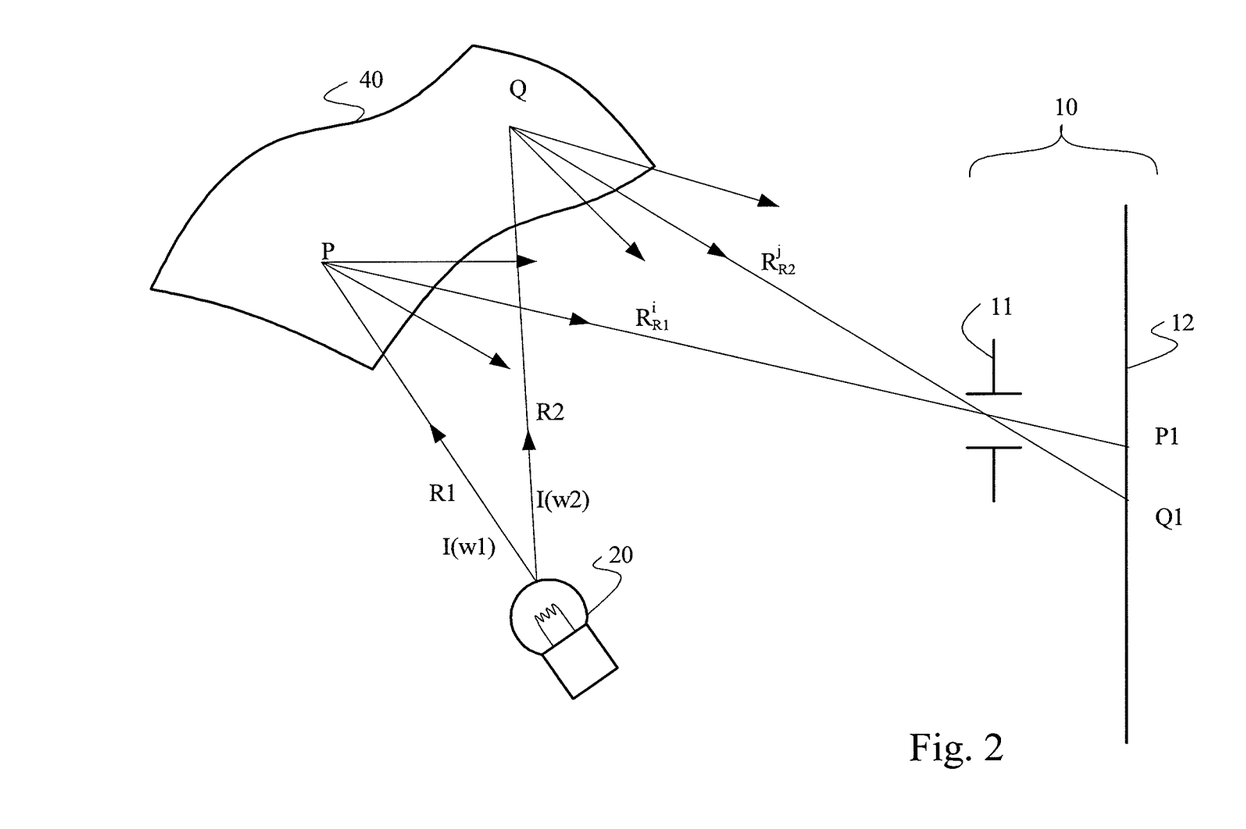
FIG. 2 is a diagram illustrating the lighting simulation that is used by the invention.

To illustrate an example of an image-simulation method that could be used by the simulation unit 36, FIG. 2 depicts an object 40, an imaging device 10 in the form of a pinhole model with its lens 11 and a sensor 12, as well as a lighting system consisting here of a light source 20. The lighting model defines the light source 20 as emitting rays in all directions in a given spatial distribution (the light intensity emitted I varies according to the direction ω of the ray in question: I(ω1) for the ray R1 and I(ω2) for the ray R2). For each ray emitted by it, a point of impact on the object 40 is calculated (such as the points P and Q for the respective rays R1 and R2) in accordance with rules of geometry (intersection of the estimated 3D model of the object 40 with the straight line carrying the ray in question). The light intensity received at a point of impact on the object 40 depends on the light intensity I(ω1) of the light source 20 in the direction ω in question and the distance that separates this point from the light source 20.

It is possible to limit this calculation solely to the rays that give a point of impact on the object 40 or even solely to the rays that give a point of impact inside one or more areas of interest of the object 40.

Depending on the reflection model used, Lambertian model, Phong model, or the like, at each point of impact a plurality of rays are re-sent in all possible directions with intensities varying with these directions. For example, FIG. 2 depicts only, at points P and Q, three rays respectively issuing from the rays R1 and R2. Each incident ray, if it is captured by the imaging device 10, forms a point of impact with the sensor 12 and gives thereto a light intensity that is a function not only of the reflection on the object but also the distance that separates this point of impact from the previous point of impact on the object.

Thus it is possible to determine, from point to point, the total light intensity at each point on the sensor 12 that depends on the values of the light intensities for each ray reflected on the object 40 and therefore each incident ray issuing from the light source 20. The result of this simulation is a simulated image $I_S$.

The processing unit 30 also comprises a correction unit 37, the essential function of which is to modify at least one characteristic, such as the light intensity, of each point of the image or of at least one area of interest of the image actually taken by the imaging device according to the light intensity of the corresponding point in the simulated image or of a set of points adjacent to said corresponding point in the simulated image.

For example, the function of the correction unit 37 is to correct the image $I_I$ (see FIG. 1) that is actually taken by the imaging device 10 so that the resulting corrected image $I_C$ is representative of the object 40 if it were uniformly illuminated by the light source 20 and if the imaging device 10 received the light intensity directly reflected at each of the points of the object 40 or part of interest of the object 40.

To do this, the darker an area of the simulated image $I_S$, the more the corresponding area of the image $I_I$ actually taken by the imaging device 10 will be raised in light intensity, and conversely, the lighter this area of the simulated image $I_S$, the darker will be the corresponding area of the image $I_I$ actually taken by the imaging device 10

For example, if a point p on the image actually taken by the imaging device 10 has a light intensity $I_I(p)$ and the corresponding point on the simulated image has a light intensity $I_S(p)$, the light intensity $I_C(p)$ at this point p in the corrected image is given by the equation:

$$I_C(p) = I_I(p) \cdot \frac{1}{I_S(p)} = I_I(p) \cdot F(p)$$

where F(p) is the correction factor applied at the point p of the image actually taken by the imaging device 10

In general terms, the correction factor F(p) is a decreasing function of the light intensity of the point in the simulated image of said object corresponding to the point p.

It may also be a decreasing function of the light intensity of a plurality of points adjacent to the point on the simulated image corresponding to the point p of the image actually taken by the imaging device the intensity of which is to be corrected. For example, in the above equation, $I_S(p)$ may be the average of the respective light intensities of the points on the simulated image adjacent to a point on the simulated image corresponding to the point p and therefore the correction factor F(p) a decreasing function of the average of these intensities.

The simulation unit 36 may determine areas of the object in which specularities are present, that is to say areas that reflect, without significant diffusion, the rays issuing from the light source 20, the rays thus reflected directly striking the imaging device 10. These areas cannot generally be used, in particular for character recognition, since the quantity of light thus reflected causes saturations of the digital image produced. In order to warn the user to modify the position of the object 40 for further photographing by the imaging device 10, it is possible to provide an alarm 50 that is then triggered when such specularities occur.

In another embodiment, when specularities are detected by the simulation unit 36, a mask is created on the image $I_I$ actually taken by the imaging device 10 in order not to take into account, during subsequent image-correction processing, the areas of the object 40 where these specularities occur.

More generally, the image correction can be applied only for the points on the simulated image having values that lie between a maximum threshold value and a minimum threshold value. Thus, in the case where a specularity is detected in the image simulated by the simulation unit 36, the image actually taken by the imaging device 10 will not be able to be corrected for the image points in question. Likewise, in the case where the level in the simulated image is too low, or even zero, the image actually taken by the imaging device 10 cannot be corrected.

In addition, a mask of the points on the corrected image will be able to be created for subsequent use by image-analysis algorithms. Such a mask can enable image-analysis algorithms used subsequently, for example to calculate statistics on the image, not to take into account the points on the corrected image that have not been corrected since their values do not lie between said two threshold values. These points correspond either to specularities or to areas of very low (or even zero) light intensity.

This approach is also one of the ways of managing numerical problems of division by zero, but especially enables the image-analysis algorithms to have information on the reliability of the image points processed.

In a particular embodiment, the simulated image will have a maximum value of 1 for the useful area corresponding to the object in question and outside any specular reflection area and the image actually taken by the imager will therefore not be modified, or only a little, for its points corresponding to the parts of the object that are more illuminated but do not cause a specular reflection (values close to 1 of the simulated image) and will be corrected so that, the weaker the illumination given by the value of the simulated image at the corresponding points, the higher the level for its other points.

In another embodiment, the simulated image will be calculated to within a factor, and the dynamic range of the corrected image will be determined according to the quantisation of the corrected image required, for example from 0 to 255 for quantisation in 8 bits, and according to a criterion aimed at exploiting the entire dynamic range of intensities possible for the corrected image.

Having regard firstly to the precision of the spatial sampling of the estimation of the 3D model of the object of interest and secondly of the reflection models proposed here, which correspond to a hypothesis of homogeneous material, that is to say they do not take account of local variations in reflection of the object, for example created by patterns printed on the object in question or furrows on its surface, such as furrows on a skin, the simulated image can be considered to be an approximation to a certain scale of the image that would be taken by the imaging device for an object that would have the same 3D characteristics to the scale of the simulation and which would be formed by a homogeneous material corresponding to the properties of the reflection model adopted. The correction that is the subject matter of the present invention is then a correction to the uniformity of the image of the object vis-á-vis its positioning, and the characteristics of the lighting system and of the photography system FIG. 3 depicts another embodiment of an image pickup system of the invention, according to which the imaging device 10 is replaced by one of the two cameras 341 or 342 (in this case the camera 342, which has an output for the image signals of the image $I_I$ taken at time T0).

Likewise, each camera 341 and 342 can be used as imaging device 10, the method of the present invention consisting of correcting the images actually taken by each imaging device 10.

Figure 3:
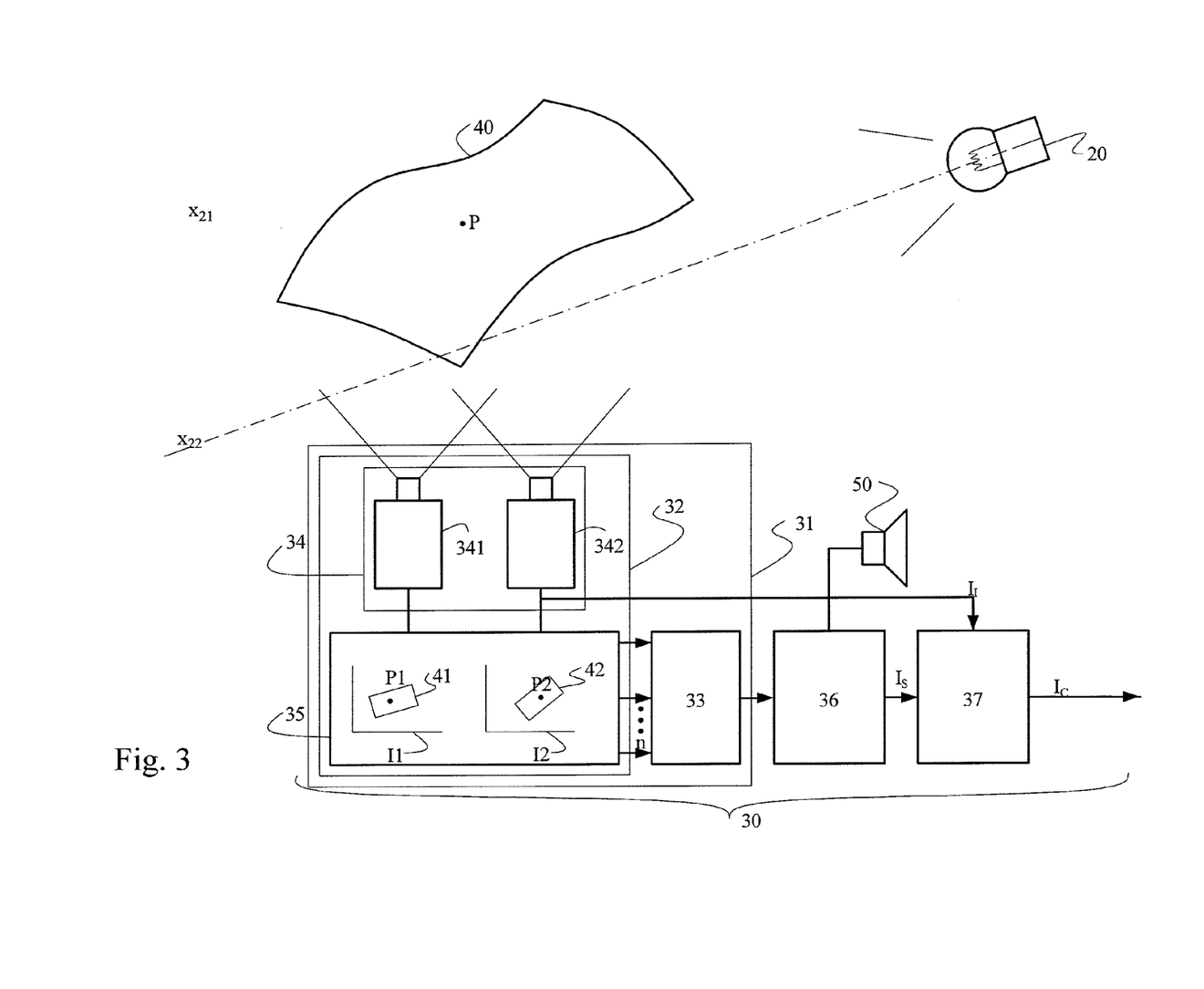
FIG. 3 is a block diagram of an image pickup system according to a second embodiment of the invention.
Figure 4:
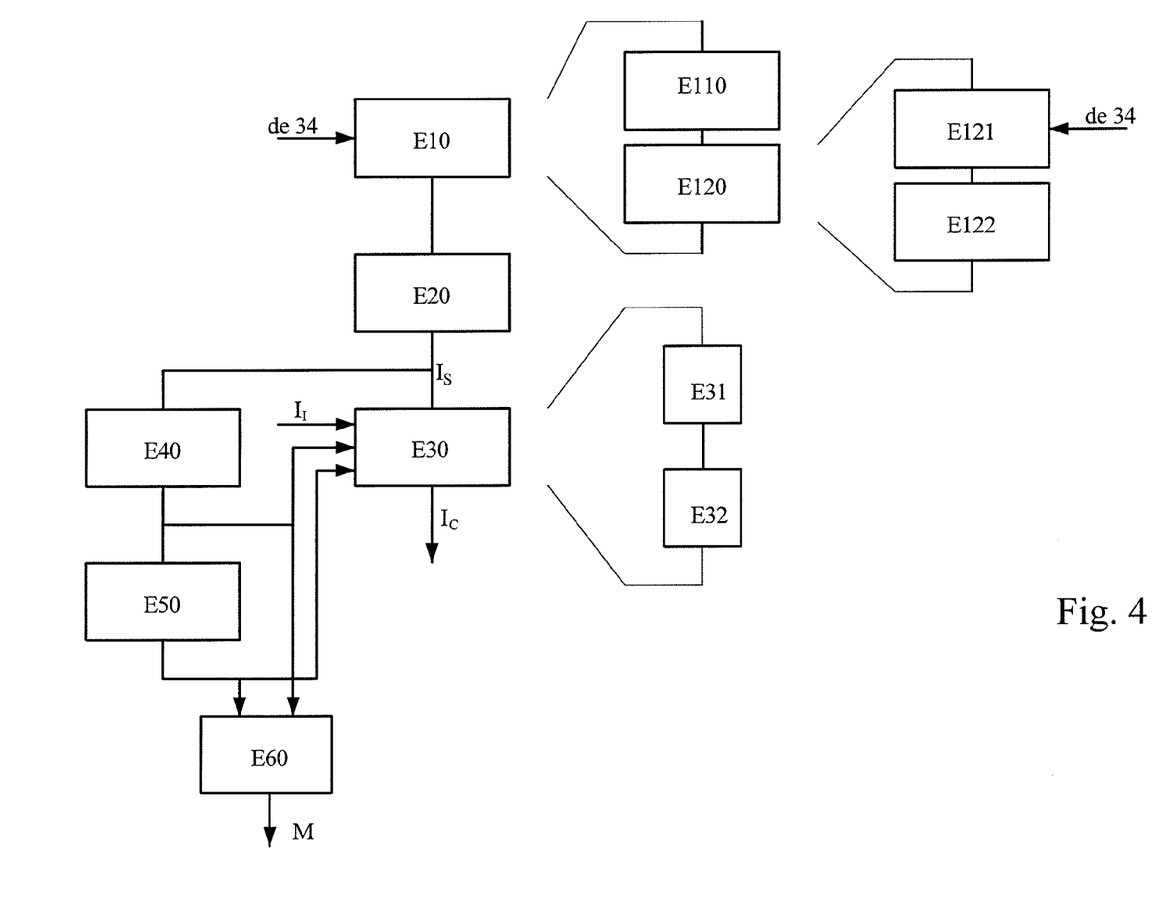
FIG. 4 is a diagram showing the various steps implemented by a method for taking an image of an object according to the present invention.

FIG. 4 depicts a diagram illustrating an image picking up method according to the invention that is advantageously used by means of an image pickup system such as the one depicted in FIG. 1 or the one depicted in FIG. 3.

Step E10 is a step of estimating a 3D model of the object as it is at time T0 of the taking of the image by said imaging device 10. More precisely, step E10 comprises a step E110 of detecting an object in the scene and a step E120 that is the step of estimating a 3D model of the object strictly speaking. Step E120 itself comprises a step E121 of taking images by means of a 3D image pickup apparatus 34, such as the system 34, and a step E122 of determining the 3D model of the object that was taken at step E121 by the 3D image pickup apparatus 34.

Step E20 is a step of simulating the image of the object 40 at time T0, on the basis of the 3D model estimated at step E10, of a model of the lighting of the object including intrinsic and extrinsic parameters of the lighting system 20, of a reflection model of the object or of each part of the object able to be taken by the imaging device 10 and of a model of the imaging device 10. The result of this step E20 is a simulated image $I_S$. This image is a digital image that is characterised by a set of pixels, to each of which a numerical value relating to the light intensity of this pixel is allocated. In one embodiment of the invention, only one or more areas of interest of the object 40 are processed during the simulation step E20.

Step E30 is a step of correcting the image $I_I$ or of an area of interest of said image $I_I$ taken by said imaging device 10 at the end of which a corrected image $I_C$ is obtained.

This step 30 consists of considering a point on the image $I_I$ taken by the imaging device 10. Only the points on the image taken by the imaging device 10 that are in one or more areas of interest can be considered. This correction step E30 consists of modifying the light intensity of each point of the image $I_I$ or of at least one area of interest of the image $I_I$ actually taken by the imaging device 10 according to the light intensity of the corresponding point in the simulated image $I_S$ or the respective light intensities of points adjacent to said corresponding point in the simulated image $I_S$. For example, it consists again of correcting the image $I_I$ taken by the imaging device 10 and, more exactly, increasing the light intensity of each point on the image $I_I$ or of at least one area of interest of the image $I_I$ actually taken by the imaging device 10 to a greater extent, the lower the light intensity of the corresponding point in the simulated image $I_S$, and/or reducing the light intensity of each point on the image $I_I$ or of at least one area of interest on the image $I_I$ actually taken by the imaging device 10 to a greater extent, the higher the light intensity of the corresponding point in the simulated image $I_S$.

More precisely, the correction step E30 includes a calculation step E31 for calculating, for each point on the image or on at least one area of the image taken by said imaging device, a correction factor that is a decreasing function of the light intensity of the corresponding point in the simulated image of said object or of the respective light intensities of points adjacent to said corresponding point in the simulated image $I_S$, and a processing step E32 for modifying the light intensity of the point on the image $I_I$ or on at least one area of the image actually taken by said imaging device 10 in proportion to said ratio.

In a particular embodiment, said method also comprises a step E40 of determining points on the simulated image for which the light intensity is above a maximum threshold and a step E50 of determining points on the simulated image for which the light intensity is below a minimum threshold. According to this particular embodiment, said correction step E30 is not implemented for the points on the image taken by the imaging device corresponding to the points on the simulated image thus determined at steps E40 and E50.

In another embodiment, said method also includes a step E60 of creating a mask M corresponding to the points thus determined at steps E40 and E50 so that subsequent image processings of the corrected image do not take into account the corresponding points on said corrected image.

This method is implemented by a processing unit such as the processing unit 30 in FIGS. 1 and 3.

Figure 5:
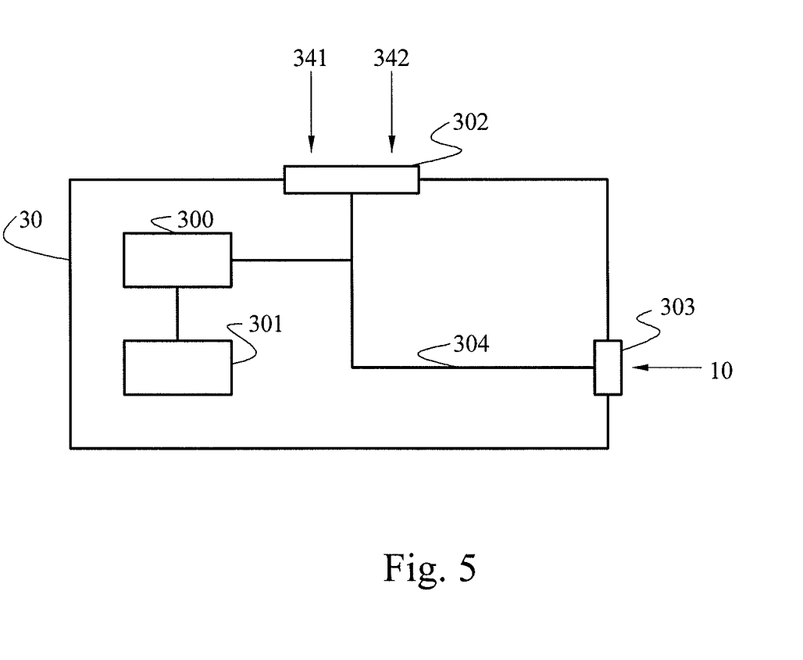
FIG. 5 is a block diagram of a computer system able to implement a method for taking an image according to the present invention.

Advantageously, the units 33, 35 to 37 of this processing unit 30 are implemented by means of a computer system such as the one shown schematically in FIG. 5.

This computer system comprises a central unit 300 associated with a memory 301 in which there are stored firstly the code of the instructions of a program executed by the central unit 300 and secondly data used for executing said program. It further comprises a port 302 for interfacing with the 3D image pickup apparatus 34, for example with the cameras 341 and 342 in FIGS. 1 and 3, and a port 303 for interfacing with the imaging device 10. The central unit 300 and the ports 302 and 303 are connected together by means of a bus 304.

The central unit 300 is capable of executing instructions loaded in the memory 301, from for example storage means, such as an external memory, a memory card, a CD, a DVD, a server of a communication network, etc. These instructions form a computer program causing the implementation, by the central unit 300, of all or some of the steps of the method in the invention that was described in relation to FIG. 4.

Thus all or some of the steps may be implemented in software form by the execution of a set of instructions by a programmable machine, such as a DSP (digital signal processor) or a microcontroller. All or some of the steps may also be implemented in hardware form by a machine or a dedicated component, such as an FPGA (field-programmable gate array) or an ASIC (application-specific integrated circuit).

The invention claimed is:

1. A method for correcting an image taken by an imaging device of an object presented at a distance in front of said imaging device, said object being illuminated by means of a lighting system, wherein the method comprises the following steps:
   estimating, from at least one image taken by a 3D image pickup apparatus, a 3D model of the object as it is at the time said imaging device takes said image,
   calculating the light intensity of each point of a simulated image as it would be taken by the imaging device, using said thus estimated 3D model of the object, a model of the illumination of the object illuminated by said lighting system, a model of reflection on a surface of the object and a model of said imaging device, in order to obtain a simulated image of said object, and
   determining points on the simulated image for which the light intensity is above a maximum threshold,
   determining points on the simulated image for which the light intensity is below a minimum threshold, the minimum threshold being different from the maximum threshold,
   correcting the image taken by said imaging device, comprising modifying the light intensity of each point on the image actually taken by the imaging device or on at least one area of interest of the image actually taken by the imaging device, according to the light intensity of the corresponding point in the simulated image or the respective light intensities of points adjacent to said corresponding point in the simulated image, the correcting including:
   calculating, for each point of the image or of at least one area of the image taken by said imaging device, a correction factor that is a decreasing function of the light intensity of the corresponding point in the simulated image of said object, and
   modifying the light intensity of each point of the image or of at least one area of the image actually taken by said imaging device in proportion to said correction factor,
   said correcting not being performed for the points on the image taken by the imaging device corresponding to the points on the simulated image thus determined.

2. The method for correcting an image according to claim 1, further comprising:
   determining points on the simulated image for which the light intensity is above a maximum threshold,
   determining points on the simulated image for which the light intensity is below a minimum threshold,
   said correction step not being performed for the points on the image taken by the imaging device corresponding to the points on the simulated image thus determined.

3. The method for correcting an image according to claim 2, further comprising:
   creating a mask corresponding to the points thus determined at the determination steps so that subsequent image processings of the corrected image do not take into account the corresponding points on said corrected image.

4. The method for correcting an image according to claim 1, wherein said step of determining said 3D model uses a stereoscopic method involving pairs of views taken by said 3D image pickup system, said 3D image pickup system comprising either of two cameras taking respectively the views of each pair simultaneously, or a camera taking the views of each pair at two different times.

5. The method for correcting an image according to claim 4, wherein one or other or both of the two cameras of said 3D image pickup system constitutes said imaging device.

6. An image pickup system for delivering a corrected image of an image taken by an imaging device of an object presented at a distance in front of said imaging device, said object being illuminated by a lighting system, wherein the image pickup system comprises circuitry adapted for:
   estimating, from at least one image taken by a 3D image pickup apparatus, a 3D model of the object as it is at the time said imaging device takes an image,
   executing an image-simulation comprising calculating the light intensity of each point on a simulated image as it would be taken by the imaging device, using said 3D model estimated, a model of the illumination of the object by said lighting system, a model of reflection on a surface of an object and a model of said imaging device, in order to obtain a simulated image of said object, and
   determining points on the simulated image for which the light intensity is above a maximum threshold,
   determining points on the simulated image for which the light intensity is below a minimum threshold, the minimum threshold being different from the maximum threshold,
   correcting the image taken by said imaging device in order to modify the light intensity of each point on the image actually taken by the imaging device or on at least one area of interest of the image actually taken by the imaging device, according to the light intensity of the corresponding point in the simulated image or the respective light intensities of points adjacent to said corresponding point in the simulated image, the correcting comprising:
   calculating, for each point on the image or on at least one area of the image taken by said imaging device, a correction factor that is a decreasing function of the light intensity of the corresponding point in the simulated image of the said object, and
   modifying the light intensity of each point on the image or at least one area of the image actually taken by said imaging device in proportion to said correction factor,
   said correcting not being performed for the points on the image taken by the imaging device corresponding to the points on the simulated image thus determined.

7. The image pickup system according to claim 6, wherein the circuitry comprised in the image pickup system is further adapted for:

determining points on the simulated image for which the light intensity is above a maximum threshold, determining points on the simulated image for which the light intensity is below a minimum threshold, the correcting of the image taken by said imaging device not taking into account the points on the image taken by the imaging device corresponding to the thus determined points of the simulated image.

8. The image pickup system according to claim 7, wherein the circuitry of the image pickup system is further adapted for:

creating a mask corresponding to the thus determined points of the simulated image, said mask being designed so that processings of images subsequent to the corrected image do not take into account the corresponding points on said corrected image.

9. A non-transitory storage medium that stores a computer program comprising instructions for the implementation, by a central unit of an image pickup system, of a method according to claim 1, when said program is executed by said central unit.

\* \* \* \* \*